United States Patent [19]

Mimasu et al.

[11] Patent Number: 5,182,691
[45] Date of Patent: Jan. 26, 1993

[54] MAGNETIC HEAD CLEANING SYSTEM FOR ROTARY HEAD DEVICES

[75] Inventors: Kazuo Mimasu, Yaita; Katsuhiko Watanabe; Nobutoshi Suzuki, both of Utsunomiya, all of Japan

[73] Assignee: Sharp Kabushiki Kaisha, Osaka, Japan

[21] Appl. No.: 666,052

[22] Filed: Mar. 7, 1991

[30] Foreign Application Priority Data

Oct. 26, 1990 [JP] Japan ................................ 2-289208

[51] Int. Cl.⁵ .................................................... G11B 5/10
[52] U.S. Cl. ...................................................... 360/128
[58] Field of Search ........................................ 360/128

[56] References Cited

U.S. PATENT DOCUMENTS 4,704,647 11/1987 Hino ..................................... 360/128

FOREIGN PATENT DOCUMENTS

| | | |
|---|---|---|
| 62-22222 | 1/1987 | Japan . |
| 62-285215 | 11/1987 | Japan ................... 360/128 |
| 63-249922 | 10/1988 | Japan . |
| 1-191317 | 1/1989 | Japan ................... 360/128 |
| 1-282716 | 11/1989 | Japan ................... 360/128 |

*Primary Examiner*—A. J. Heinz
*Attorney, Agent, or Firm*—Birch, Stewart, Kolasch & Birch

[57] ABSTRACT

A system for cleaning a magnetic head provided inside a rotary drum installed on a chassis in cooperation with a mechanism for guiding a tape. The system has a cleaning device including a cleaning lever capable of pivoting freely, supported by a pivot secured to the chassis, a cleaning member, a spring for urging the cleaning lever so that the cleaning member may contact with the rotary drum and a pin fixed on the cleaning lever. The system also has a tape guiding mechanism including tape guiding members and a drive member for shifting the tape guiding members, capable of pivoting freely. The arrangement permits cleaning of the magnetic head by making the cleaning member contact with the rotary drum, and also permits separation of the cleaning member from the rotary drum by making the drive member contact with the pin. The cleaning member is supported by a shaft inclining from an axis perpendicular to a reference surface of the rotary drum and having a length sufficient to reach a position corresponding to the top portion of the drum, and adapted to be shifted upward along the shaft while rotating a cleaning operation.

15 Claims, 13 Drawing Sheets

MAGNETIC HEAD CLEANING SYSTEM FOR ROTARY HEAD DEVICES

FIELD OF THE INVENTION

The present invention relates to a magnetic head cleaning system including a magnetic head cleaning device, and to a cleaning unit installed in the magnetic head cleaning device, for use in a rotary drum type magnetic recording-reproduction apparatus such as VTRs or other similar apparatus.

BACKGROUND OF THE INVENTION

As shown in FIG. 9, in a conventional magnetic head cleaning system, for example, loading grooves 57, 58 are formed through a chassis 55 by the left side and right side of a rotary drum 56, and pole bases 59, 60 are respectively disposed therein, which can be shifted guided by the respective loading grooves 57, 58. Poles 61, 62 are respectively secured to the pole bases 59, 60.

At a vicinity of one end of the loading groove 58, is disposed a cleaning lever 65 capable of pivoting freely, supported by a pivot 66 secured to the chassis 55. The cleaning lever 65 has a cleaning member 63 rotatably supported by a cleaner shaft 64. The cleaning member 63 is disposed at one end of the cleaning lever 65 by the side of the rotary drum 56, and at the other end thereof is fixedly inserted a pin 67. A connecting bar 68 is connected to the cleaning lever 65 by the pin 67. In the connecting bar 68, are formed elongated holes 69, 70 which are respectively guided by pins 71, 72 secured to the chassis 55. Further, as shown in FIG. 9, at an opposite end of the connecting bar 68 to the end where the cleaning lever 65 is connected, is formed an extended portion 68a which is adapted to contact the pole base 60 in an unloading state which will be described later. Furthermore, the connecting bar 68 is provided with a spring 73 whereby a force is applied thereto in a direction as indicated by an arrow N. Furthermore, at a position on the cleaning lever 65 at a vicinity of the loading groove 58, is formed a convex portion 65a which is adapted to contact with the pole base 60 having been shifted along the loading groove 58 in a loading operation which will be described later.

On the other hand, a cam 74 is installed on the undersurface of the chassis 55, located at a position opposite to the rotary drum 56, having the connecting bar 68 in-between. Further, in the undersurface of the chassis 55, is installed a transmission gear drive lever 75 which is engaged with the cam 74 through a pin 77. The transmission gear drive lever 75 capable of pivoting freely, is supported by a pivot 76 secured to the chassis 55. An end of the transmission gear drive lever 75 is connected to a loading transmission gear 79 by a pin 78. Moreover, as is also shown in FIG. 10, a loading gear 80 and further a loading gear 81 are connected to the loading transmission gear 79, and a lever 85 is connected to the loading gear 80 through a lever 82 while a lever 83 is connected to the loading gear 81 through a lever 84. The levers 83, 85 are connected to the respective pole bases 59, 60 by pins 86, 87.

Further, as shown in FIG. 11, on the surface of the chassis 55 is installed a cam 88 at the same location as the cam 74, and a drive lever 91 connected to the cam 88 by a pin 89 is supported by a pivot 90 secured to the chassis 55, being permitted to rock freely. An end of the drive lever 91 is connected to a half-load lever 93 through a pin 92. The half-load lever 93 is supported by a pivot 94, being permitted to rock freely so that a tape 96 can be guided by a half-load shaft 95 disposed on the half-load lever 93 in a fast forward operation or rewinding operation (half-loading) of the tape 96.

The following description will discuss the operation of the mechanism.

When there is no tape to be operated (unloading), the pole bases 59, 60 are located at unloading positions, namely, positions as is shown in FIG. 9. The connecting bar 68, having been shifted in a direction indicated by an arrow N' by being pressed at the extended portion 68a thereof by the pole base 60, is positioned at the N' side. As a result, the cleaning member 63 is located at a position away from the rotary drum 56.

When tape loading (hereinafter referred to as loading) is started, which is defined as an action to draw the tape 96 from a cassette case, not shown, and wrap it onto the rotary drum 56, the cam 74 is rotated in a direction indicated by an arrow L by a motor, not shown, and subsequently, the transmission gear drive lever 75 Pivots in a direction indicated by an arrow M on the pivot 76. Further, following the pivoting of the transmission gear drive lever 75, the loading transmission gear 79, loading gear 80 and loading gear 81 pivot. Following the pivoting of the loading gears 80 and 81, the respective levers 82, 85 as well as levers 84, 83 are shifted, whereby the pole bases 59, 60 are moved along the respective loading grooves 57, 58.

When the pole base 60 is moved, the connecting bar 68 is shifted in a direction indicated by the arrow N, guided along the elongated holes 69, 70 by the spring 73, as shown in FIG. 12. Thus, the cleaning lever 65 coupled to one end of the connecting bar 68 pivots around the pivot 66, whereby the cleaning member 63 comes into contact with the rotary drum 56. On the other hand, simultaneously with the start of loading, the rotary drum 56 rotates and magnetic heads installed inside the rotary drum 56 are cleaned by the cleaning member 63.

Further, when the pole bases 59, 60 have been shifted by the rotation of the cam 74, the pole base 60 comes into contact with the convex portion 65a of the cleaning lever 65 as shown in FIG. 9, and the cleaning member 63 separates from the rotary drum 56 again by the pivoting of the cleaning lever 65, thereby completing the cleaning operation.

Additionally, as to methods for permitting the pivoting of the cleaning lever 65, besides the above method for permitting it in accordance with the shifting of the pole base 60, another method may be taken wherein a solenoid or other device is employed.

Meanwhile, as shown in FIG. 13, the cleaner shaft 64 is disposed in a perpendicular direction to a reference plane of the rotary drum 56 such that the height at which the cleaning member 63 contacts with the rotary drum 56 is always kept constant.

However, in the above arrangement, since the cleaning member 63 always contacts with the rotary drum 56 at the constant height in cleaning operation, abrasion to the cleaning member 63 occurs unevenly. More specifically, since the abrasion occurs only at a portion thereof with which a magnetic head 97 contacts, an abrasion portion 98 is produced on the cleaning member 63 as is shown in FIG. 14. Therefore, the arrangement has a problem that a cleaning effect to the magnetic head 97 is reduced with operation time.

On the other hand, in the aforementioned arrangement wherein cleaning for magnetic heads is performed together with the loading operation, a problem is presented in that cost becomes higher; for example, in the case of operating the cleaning lever 65 by using a solenoid, it is necessary to provide an additional solenoid and driving circuit. Moreover, the arrangement shown in FIG. 9 also has problems that since it is necessary to provide the connecting bar 68 so as to shift the cleaning lever 65 in conjunction with the movement of the pole base 60, the number of parts is increased and larger space is required.

SUMMARY OF THE INVENTION

It is one object of the present invention to provide a magnetic head cleaning system wherein the number of parts is reduced and space is effectively utilized.

It is another object of the present invention to provide a cleaning member which allows abrasion thereto to occur evenly and whose life may be extended.

In order to achieve the above objects, a magnetic head cleaning system of the present invention for cleaning a magnetic head installed inside a rotary drum disposed on a chassis during guiding a tape, comprises a cleaning device and tape guiding means. The cleaning device includes a cleaning lever capable of pivoting freely, supported by a shaft secured to the chassis, cleaning means installed at one end of the cleaning lever at the rotary drum side, a resilient member for urging the cleaning lever to permit the cleaning means to come into contact with the rotary drum, and pivoting means installed on the cleaning lever, whereby cleaning for the magnetic head is performed by permitting the cleaning means to contact with the rotary drum. On the other hand, the tape guiding means includes tape guiding members for guiding the tape and a drive member capable of pivoting freely, supported by a pivot secured to the chassis, for shifting the tape guiding members, whereby the drive member is adapted to permit the cleaning means to separate from the rotary drum by pressing the pivot member.

Further, in order to achieve the above objects, a cleaning unit of the present invention comprises a cleaning member which is permitted to contact with a rotary drum provided with a magnetic head and to be rotated thereby so as to clean the magnetic head, and a support shaft which penetrates the cleaning member with a raked appearance inclining in the rotation direction of the rotary drum from an axis perpendicular to a reference plane of the rotary drum, and has a length enough to reach a position corresponding to the upper portion of the rotary drum.

The cleaning unit may further include stop means for stopping the cleaning member, positioned at the top of the support shaft.

With the arrangement, the cleaning lever is pivoted on the pivot when the drive member presses the pivoting means installed on the cleaning lever such that the cleaning means are separated from the rotary drum. When the drive member starts pivoting so as to shift the tape guiding members, pressing force onto the pivoting means by the drive member is released and at the same time, the cleaning lever is pivoted by the resilient member, thereby permitting the cleaning means to come into contact with the rotary drum. As a result, a cleaning operation can be performed. When the drive member further pivots and then the tape guiding member is shifted at a position where the tape guiding is completed, the cleaning lever comes into contact with the tape guiding members or the drive member and is pressed thereby such that the cleaning lever is permitted to pivot and the cleaning means is separated from the rotary drum, thereby completing the cleaning operation.

Furthermore, with the above arrangement, when the cleaning member in the cleaning unit comes into contact with the rotary drum, the cleaning member is rotated by the rotation of the rotary drum while being shifted upward along the support shaft due to the raked structure of the support shaft. When the cleaning operation has been completed and the cleaning member is separated from the rotary drum, the cleaning member shifts itself downward along the support shaft by its own weight.

For a fuller understanding of the nature and advantages of the invention, reference should be made to the ensuing detailed description taken in conjunction with the accompanying drawings.

BRIEF DESCRIPTION OF THE DRAWING

FIGS. 1 through 4 show one embodiment present invention wherein

FIG. 1 is a plan view illustrating the peripheral arrangement of a rotary drum in an unloading state in a magnetic recording-reproduction apparatus;

FIG. 2 is a plan view illustrating a main section of a mechanism for shifting pole bases;

FIG. 3 is a plan view illustrating the peripheral arrangement of the rotary drum in loading operation;

FIG. 4 is a plan view illustrating the peripheral arrangement of the rotary drum when loading operation has been completed;

FIGS. 5 to 7 show another embodiment of the present invention wherein

FIG. 5 is a plan view illustrating the peripheral arrangement of a rotary drum in an unloading state in a magnetic recording-reproduction apparatus;

FIG. 6 is a plan view illustrating the peripheral arrangement of the rotary drum in a half-loading operation;

FIG. 7 is a plan view illustrating the peripheral arrangement of the rotary drum when the half-loading operation has been completed.

FIGS. 9 through 14 show the prior art wherein

FIG. 9 is a plan view illustrating the peripheral arrangement of a rotary drum in a magnetic recording-reproduction apparatus;

FIG. 10 is a plan view illustrating a main section of a mechanism for shifting pole bases;

FIG. 11 is a plan view illustrating a main section of a mechanism for driving a half-load lever;

FIG. 12 is a plan view illustrating a main section wherein a cleaning member contacts with the rotary drum;

FIG. 13 is an explanatory drawing illustrating the rotary drum and a magnetic head cleaning unit;

FIG. 14 is an explanatory drawing illustrating an abrasion section on the cleaning member.

DETAILED DESCRIPTION OF THE EMBODIMENTS

The following description will discuss one embodiment of the present invention referring to FIGS. 1 to 4.

Figure 1:
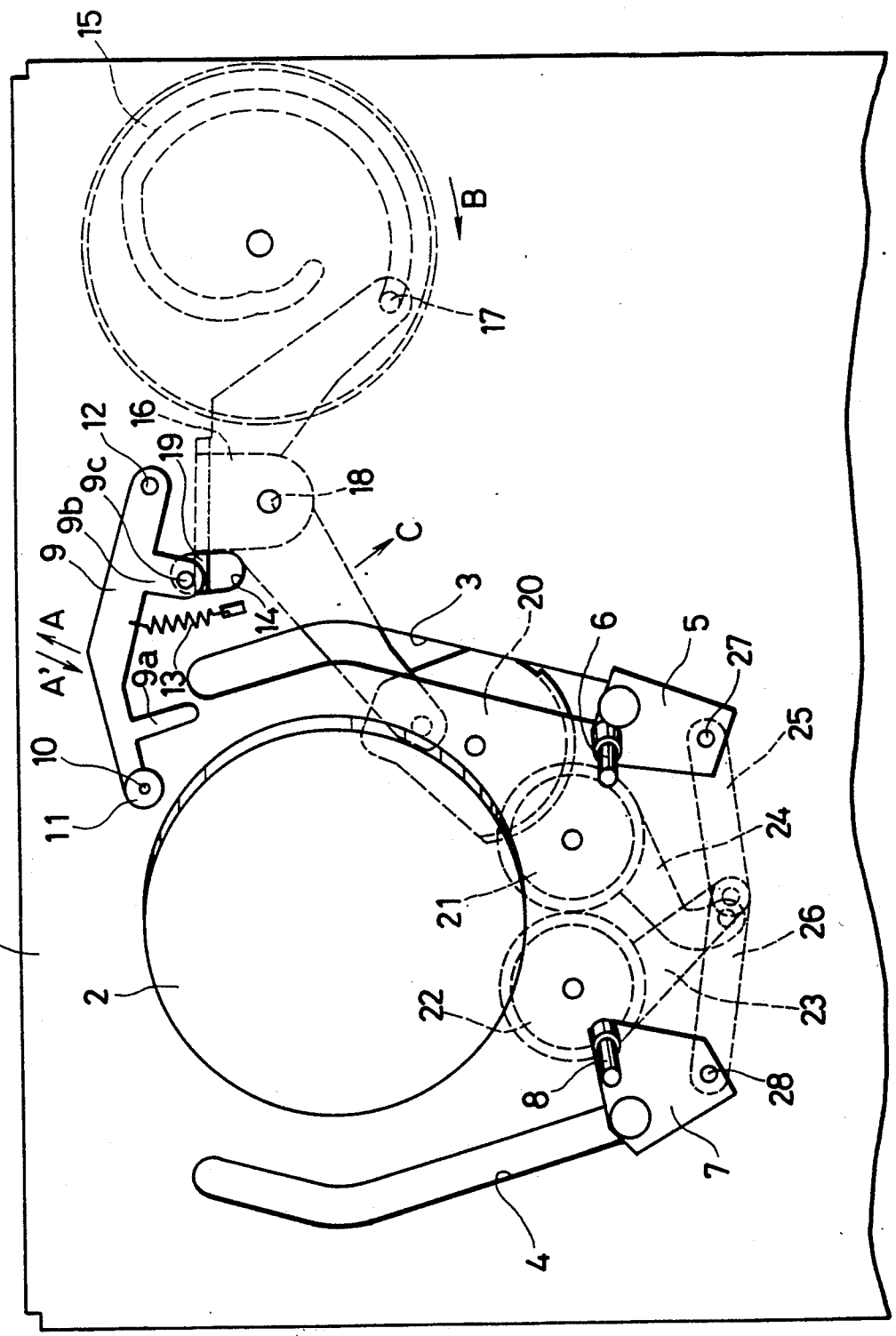

As illustrated in FIG. 1, loading grooves 3, 4 are formed through a chassis 1 by the right side and left side of a rotary drum 2 installed thereon. In the respective loading grooves 3, 4, are disposed pole bases 5, 7 as tape guiding members having respective poles 6, 8 for guiding a tape 45 (see FIG. 6), and those pole bases 5, 7 are adapted to move along the respective grooves 3, 4.

At a vicinity of one end of the loading groove 3, is disposed a cleaning lever 9 capable of pivoting freely by being supported by a pivot 12 secured to the chassis 1. At one end of the cleaning lever 9, by the side of the rotary drum 2, is installed cleaning means, for example, a cleaning member 11 freely rotatably supported by a cleaner shaft 10. Further, at side portions of the cleaning lever 9 are formed a projecting portion 9a as first pivoting means and a protruding portion 9b, and through the protruding portion 9b, a pin 9c as second pivoting means is secured thereto so that it can penetrate the chassis 1 through a hole 14 formed in the chassis 1. Moreover, to the same side portion of the cleaning lever 9 as the as a resilient member with the other end thereof fixed to the chassis 1, thereby applying a force to the cleaning lever 9 in a direction indicated by an arrow A'.

Figure 2:
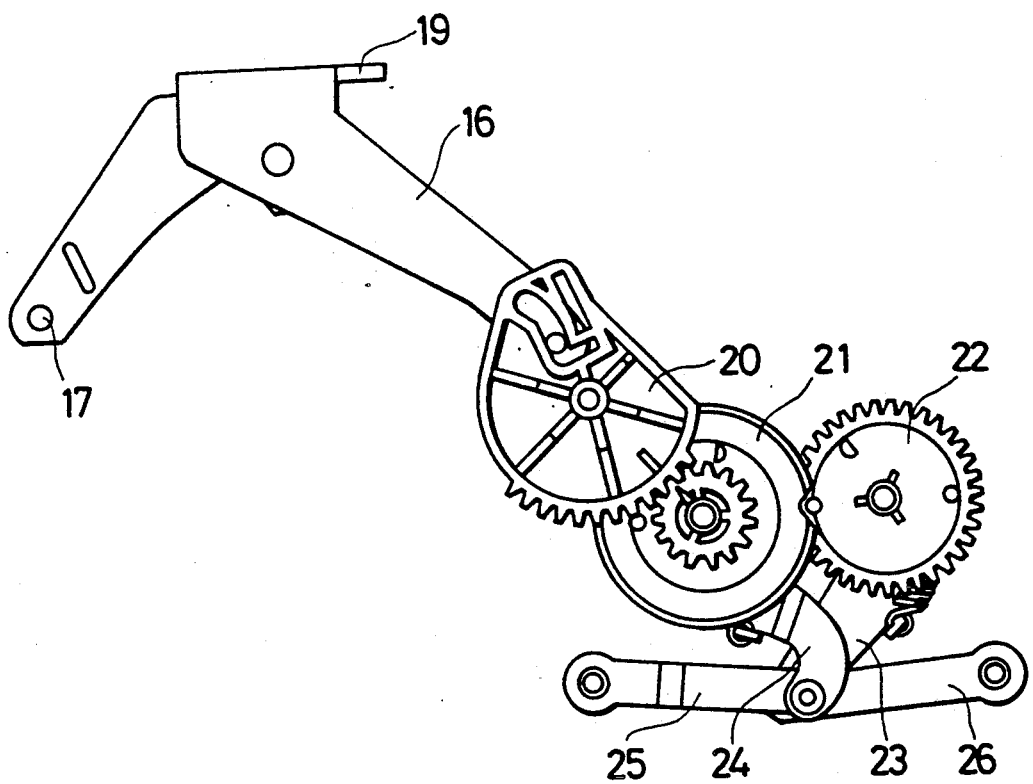

In the meantime, on the undersurface of the chassis 1, is disposed a transmission gear drive lever 16 as drive means which is capable of pivoting freely, supported by a pivot 18 as a fulcrum secured to the chassis 1. Through a pin 17 secured to one end thereof, the transmission gear drive lever 16 is coupled to a cam 15 disposed on the undersurface of the chassis 1, and the other end thereof is coupled to a loading transmission gear 20. Further, a pressing portion 19 is formed on the transmission gear drive lever 16 such that it comes into contact with the pin 9c in an unloading state. Moreover, as also illustrated in FIG. 2, the loading transmission gear 20 is coupled to a loading gear 21 and hence a loading gear 22, and a lever 25 is connected to the loading gear 21 through a lever 24 while a lever 26 is coupled to the loading gear 22 through a lever 23. The levers 25, 26 are coupled to the respective pole bases 5, 7 by respective pins 27, 28. Thus, the cam 15, transmission gear drive lever 16, loading transmission gear 20, loading gears 21, 22, levers 23, 24, 25, 26 and pole bases 5, 7 constitute tape guiding means.

The following description will discuss the operation in the above arrangement when loading.

When there is no tape loaded, the pole bases 5, 7 are positioned in the respective loading grooves 3, 4 at respective end parts thereof opposite to the cleaning lever 9 as shown in FIG. 1. Further, the cleaning lever 9 pivots on the pivot 12 in a direction indicated by an arrow A when the pressing portion 19 of the transmission gear drive lever 16 comes into contact with and presses the pin 9c of the cleaning lever 9, and consequently allows the cleaning member 11 to be located at a position away from the rotary drum 2.

Figure 3:
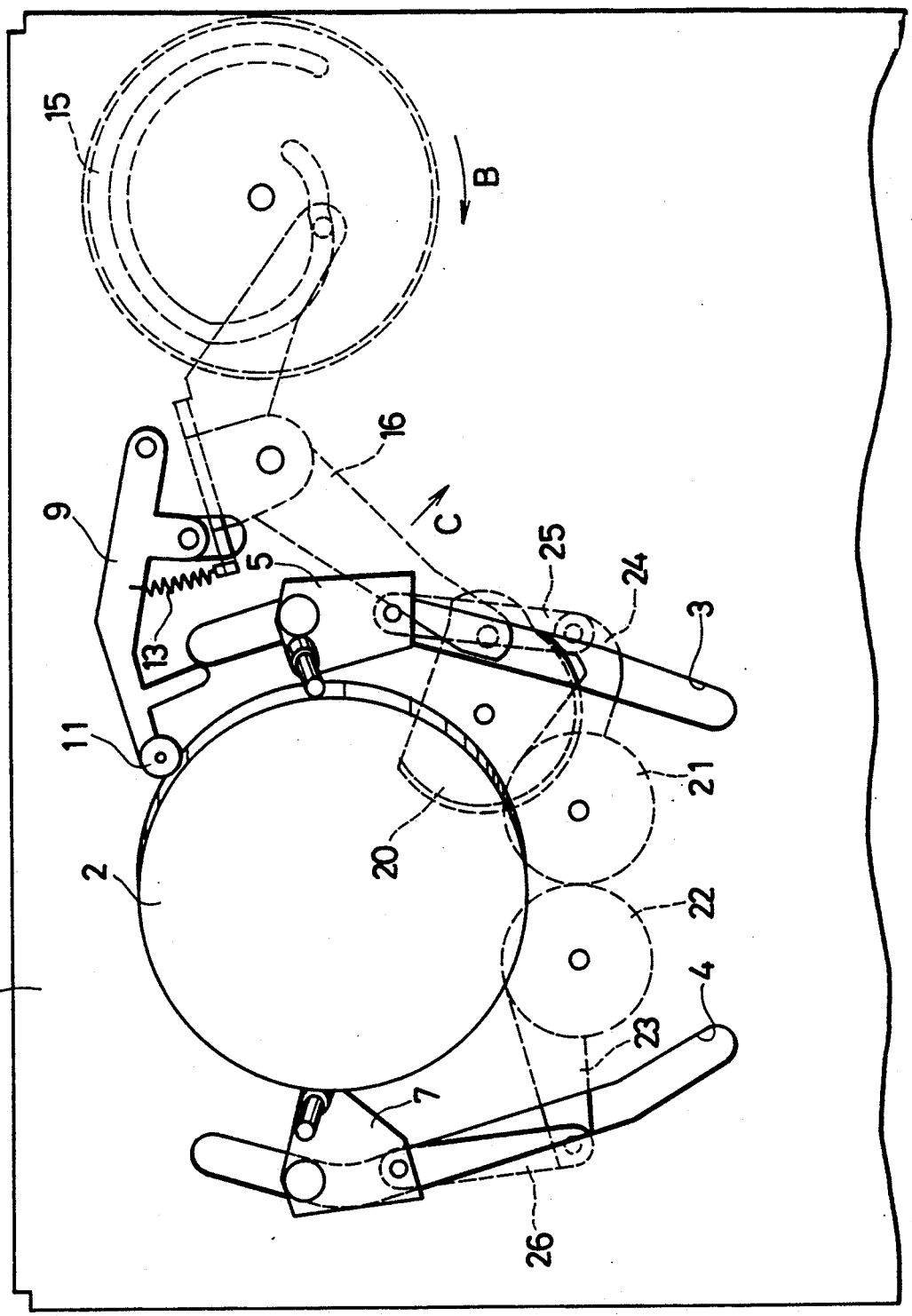

When a loading operation is started, the cam 15 is rotated in a direction indicated by an arrow B by means of a motor (not shown), whereby the transmission gear drive lever 16 pivots around the pivot 18 in a direction indicated by an arrow C. Following the pivoting movement, the pressing force given by the pressing portion 19 is released, and the cleaning lever 9 is pivoted by the spring 13 in a direction indicated by the arrow A', thereby permitting the cleaning member 11 to come into contact with the rotary drum 2 as is illustrated in FIG. 3. The rotary drum 2 has been rotating since the start of the loading operation, and therefore at this point of time, a cleaning operation for the magnetic head of the rotary drum 2 is started by the cleaning member 11 contacted therewith. On the other hand, following the pivoting movement of the transmission gear drive lever 16, the loading transmission gear 20 connected to the one end thereof also rotates clockwise in FIG. 3, and consequently permits the loading gear 21, lever 24 and lever 25 to be respectively rotated or shifted. Thus, the pole base 5 is shifted along the loading groove 3. Similarly, the rotation of the loading gear 21 permits the loading gear 22, lever 23 and lever 26 to be respectively rotated or shifted, thereby shifting the pole base 7 along the loading groove 4.

Figure 4:
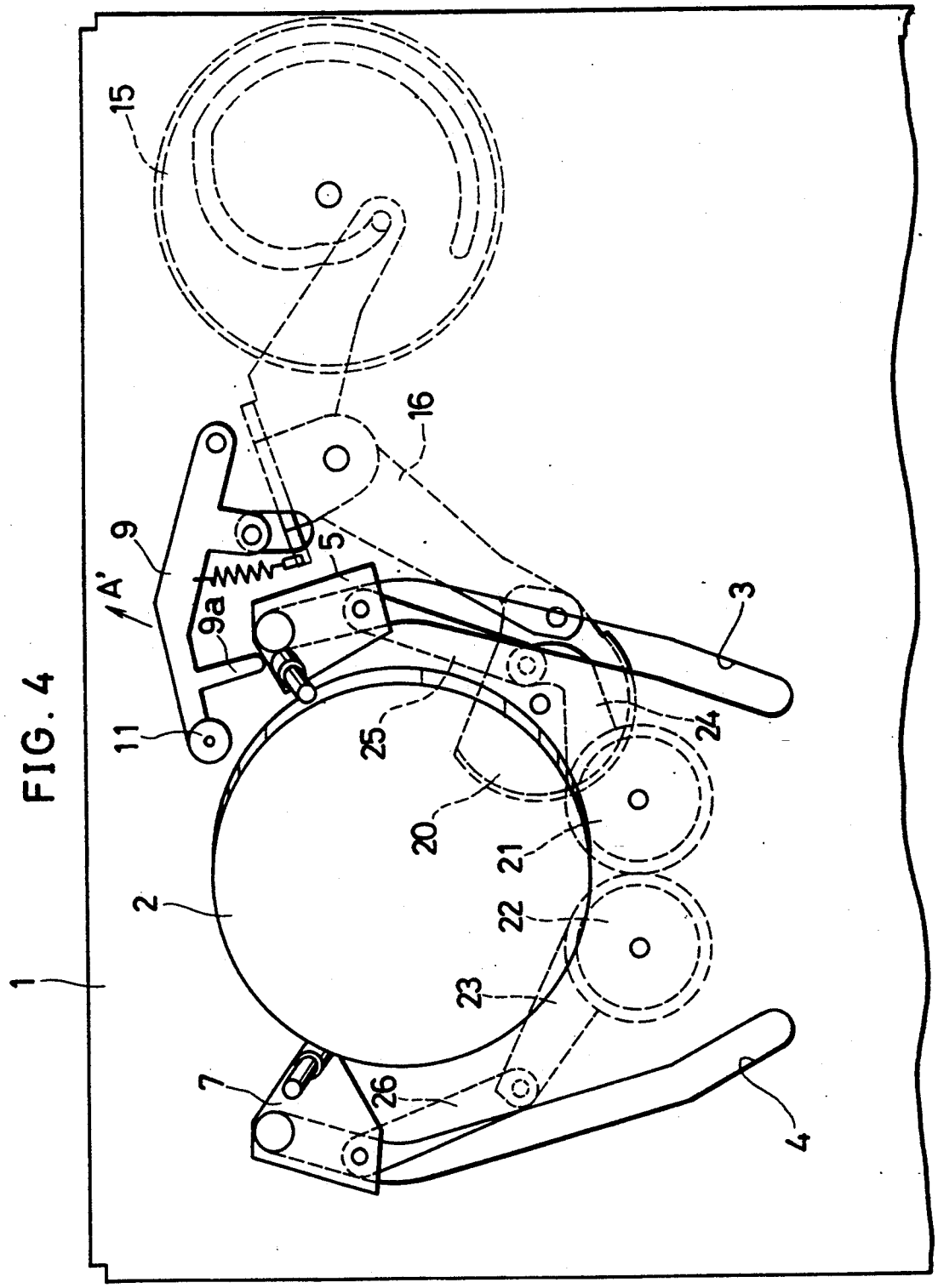

While the cam 15 is further rotated and the transmission gear drive lever 16 is further rocked, the pole bases 5, 7 are shifted along the respective loading grooves 3, 4 to be positioned at the other ends thereof opposite to the positions at the start of the loading operation through the loading transmission gear 20, loading gears 21, 22, levers 23, 24, 25 and 26, as is illustrated in FIG. 4, whereby the loading operation has been completed. At this time, since the pole base 5 comes into contact with the cleaning lever 9 at its projecting portion 9a, the cleaning lever 9 is pressed to be shifted in a direction indicated by the arrow A'. As a result, the cleaning member 11 is separated from the rotary drum 2 again, thereby completing the cleaning operation of the magnetic head.

Figure 5:
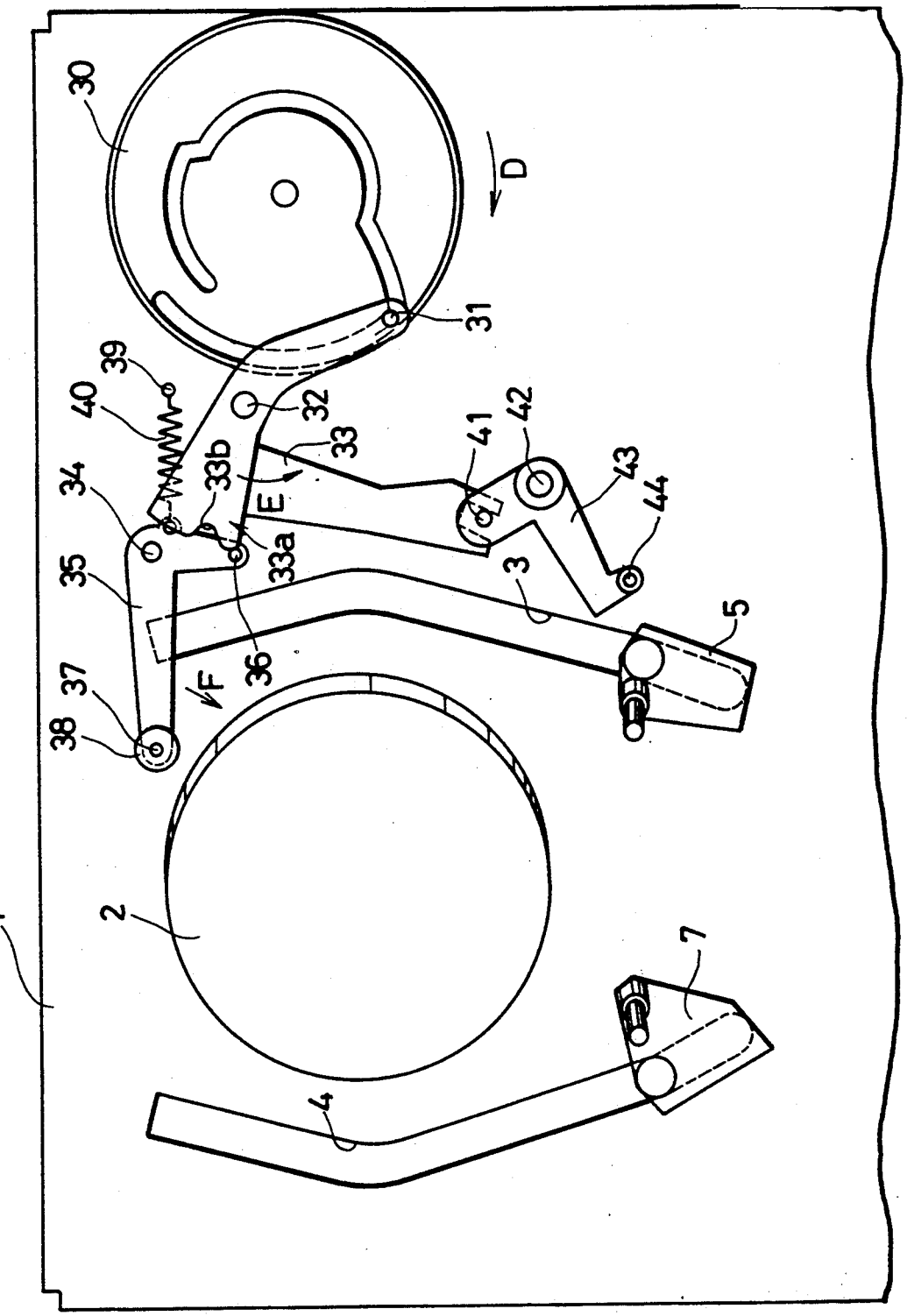
Figure 6:
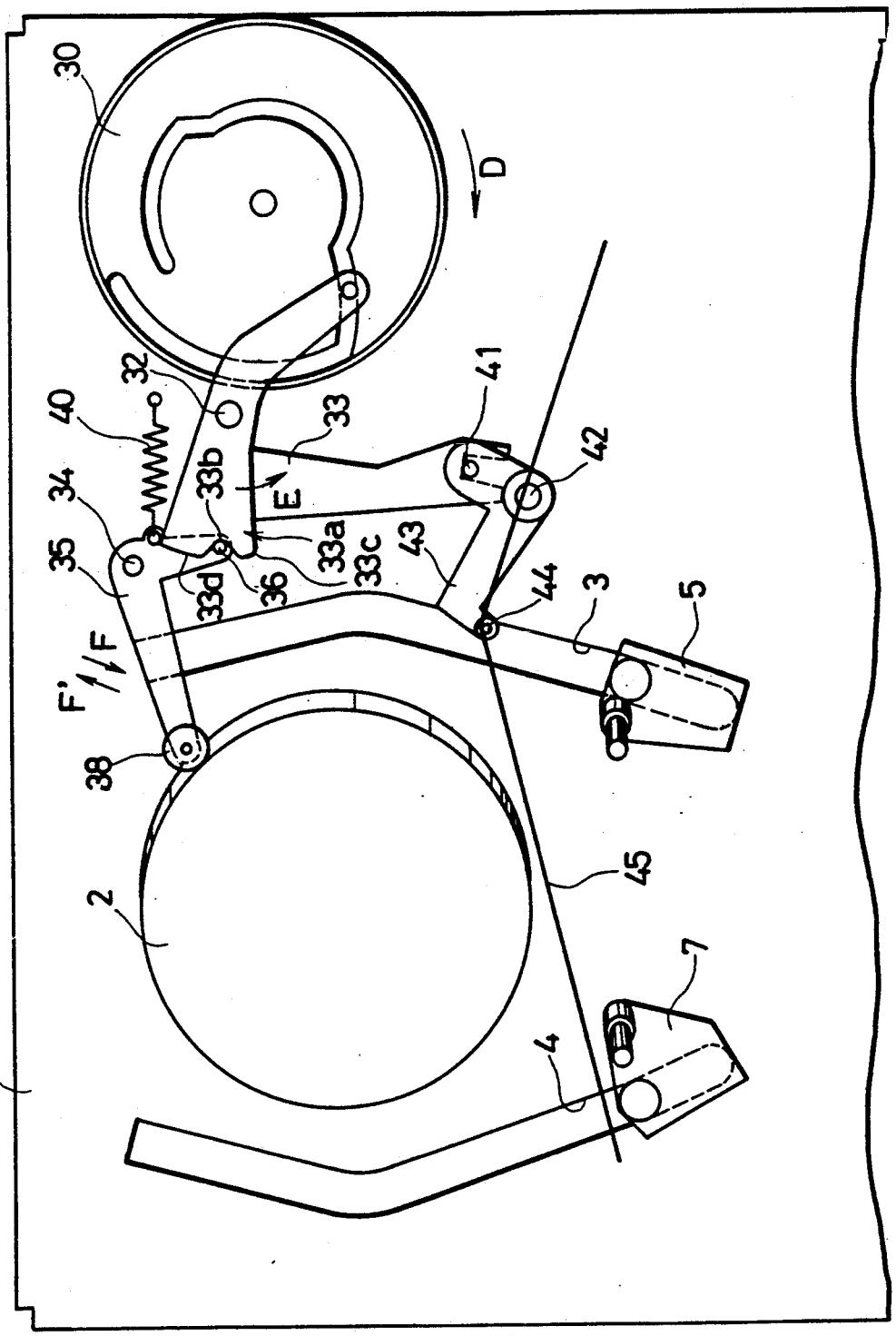
Figure 7:
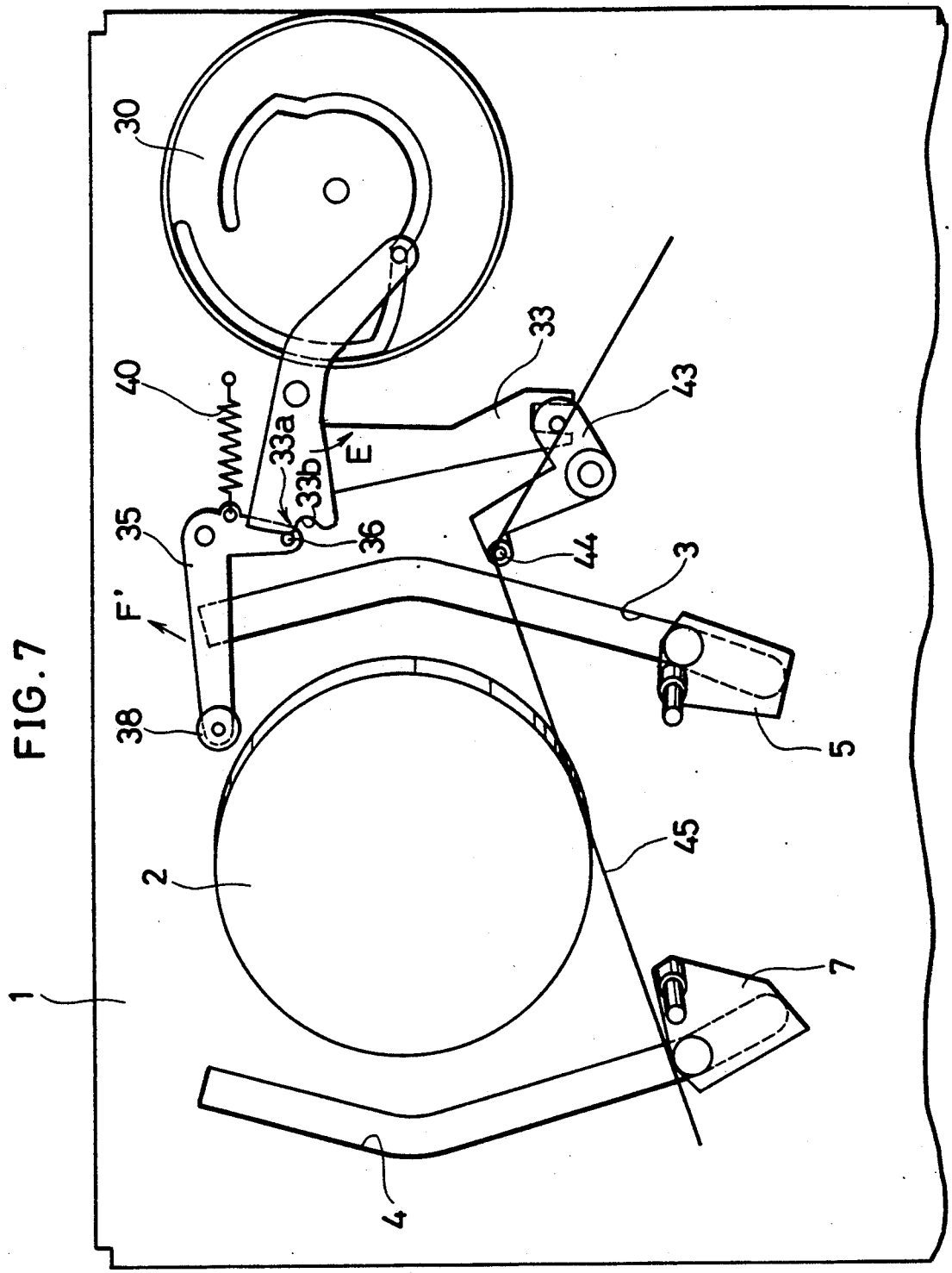

The following description will discuss another embodiment of the present invention referring to FIGS. 5 through 7.

Additionally, those of the members having the same functions and described in the aforementioned embodiment are indicated by the same reference numerals and the description thereof is omitted.

The present invention has an arrangement wherein a cleaning operation for a magnetic head can be performed in cooperation with a fast forward or rewinding (half-loading) operation of a tape. As illustrated in FIG. 5, a cam 30 is installed on a chassis 1, and one end of a drive lever 33 as drive means which is capable of pivoting freely, supported by a pivot 32, is coupled to the cam 30 through a pin 31. The drive lever 33 has a bent shape in its center portion, and an extended portion 33a is formed at the bent portion as illustrated in FIG. 5. Further, the extended portion 33a has a first edge portion 33c as first pressure means and a second edge portion 33d as second pressure means, both of which are shaped by a cam portion 33b formed at one end of the extended portion 33a. The other end of the drive lever 33 is connected through a pin 41 to one end of a half-load lever 43 as a tape guiding member which is capable of pivoting freely, supported by a pivot 42 secured to the chassis 1. On the other end of the half-load lever 43, is installed a half-load shaft 44 for guiding a tape in half-loading operation which will be described later. The cam 30, drive lever 33 and half-load lever 43 constitute tape guiding means.

On the other hand, between the extended portion 33a and the rotary drum 2 is installed a cleaning lever 35 capable of rocking, supported by a pivot 34 secured to the chassis 1. At one end of the cleaning lever 35, by the side of the rotary drum 2, is installed a cleaning member 38 freely rotatably supported by a cleaner shaft 37, while at the other end thereof, is installed a pin 36 as pivoting means which is adapted to come into contact with the first edge portion 33c of the extended portion 33a. Moreover, to the cleaning lever 35 is secured one end of a spring 40 as a resilient member, with the other end thereof fixed to the chassis 1 so as to permit the pin 36 to come into contact with the extended portion 33a.

The following description will discuss the operation in the above arrangement when half-loading.

As illustrated in FIG. 5, in a condition before a half-loading operation where there is no tape loaded, the pin 36 of the cleaning lever 35 contacts with the first edge portion 33c of the drive lever 33, whereby the cleaning member 38 is located at a position away from the rotary drum 2. When a half-loading operation is started, the cam 30 is rotated in a direction indicated by an arrow D by the motor (not shown), whereby the drive lever 33 pivots on the pivot 32 in a direction indicated by an arrow E. Following the pivoting movement, as illustrated in FIG. 6, the pin 36 comes into contact with the cam portion 33b of the extended portion 33a, and consequently the cleaning lever 35 pivots on the pivot 34 in a direction indicated by an arrow F, thereby permitting the cleaning member 38 to come into contact with the rotary drum 2. The rotary drum 2 has been rotating since the start of the half-loading operation, and therefore at this point of time, a cleaning operation for the magnetic head is started by the cleaning member 38 contacted therewith.

In cooperation with the above movements, the half-load lever 43 coupled to the drive lever 33 by the pin 41 pivots on the pivot 42, whereby a tape 45 is guided by the half-load shaft 44.

When the cam 30 further rotates, the drive lever 33 further pivots in the direction indicated by the arrow E, and consequently the pin 36, which has contacted with the cam portion 33b, comes into contact with the second edge portion 33d, as is illustrated in FIG. 7. According to the movement of the pin 36, the cleaning lever 35 pivots in a direction indicated by the arrow F', and the cleaning member 38 is separated from the rotary drum 2, thereby completing the cleaning operation for the magnetic head.

With the above arrangement, in a loading operation or a half-loading operation for a tape, without employing conventional parts such as connecting bars or other members, a cleaning operation for the magnetic head provided inside the rotary drum can be achieved in cooperation with the movements of the tape guiding members and the drive member for driving the tape guiding members. As a result, the arrangement presents the marked effect of reducing cost and saving space by reducing the number of parts required.

Figure 8:
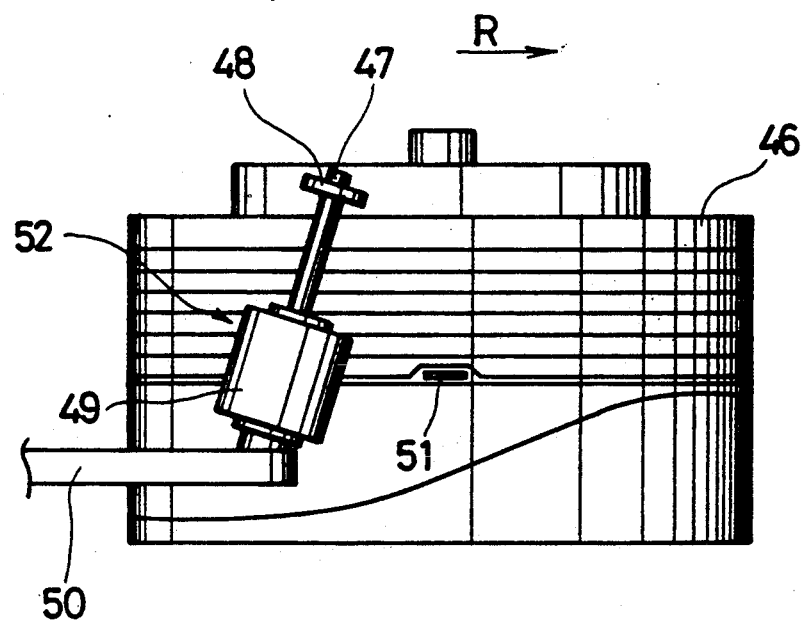
FIG. 8 shows still another embodiment of the present invention and is an explanatory drawing illustrating a rotary drum and a cleaning unit.
Figure 9:
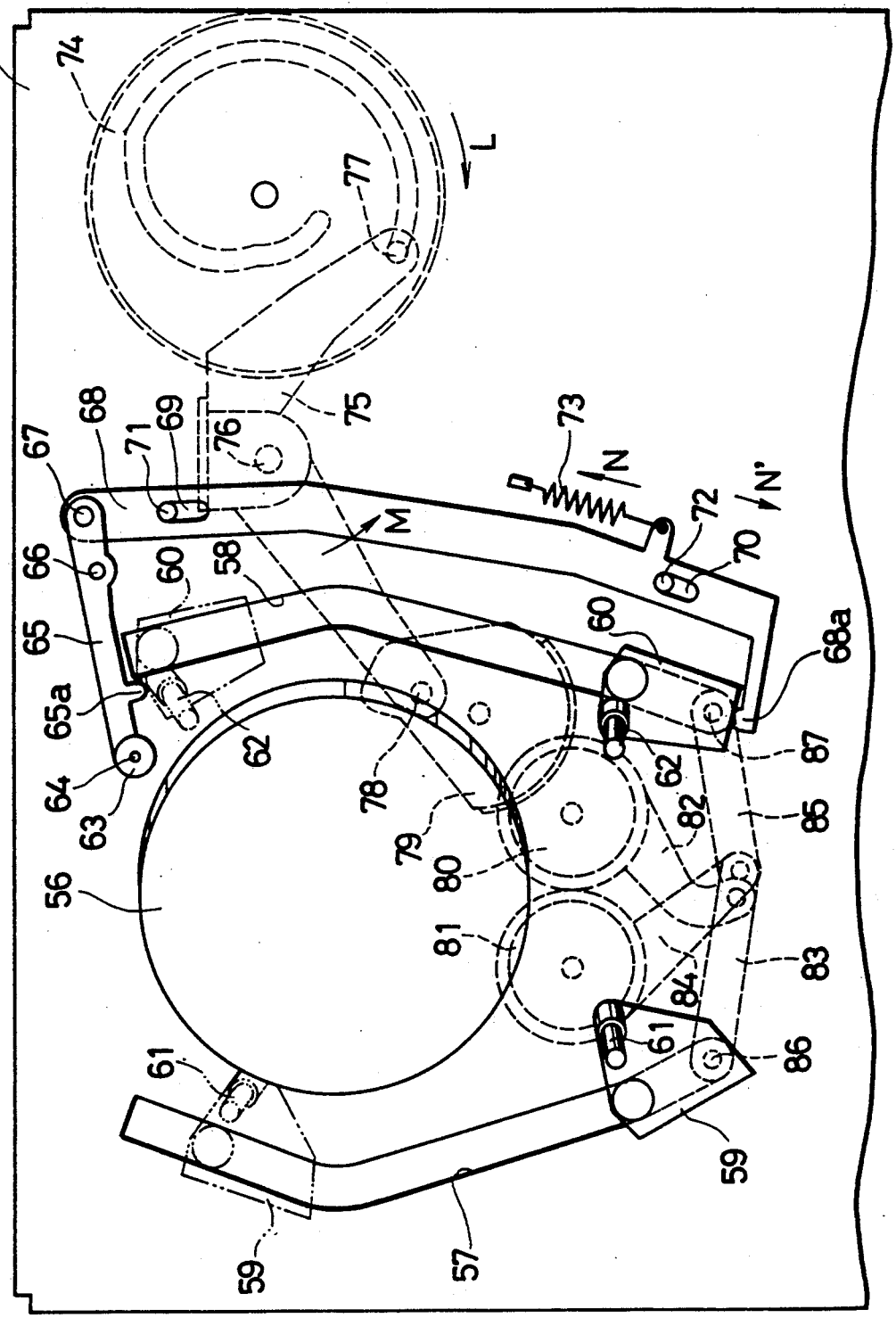
Figure 10:
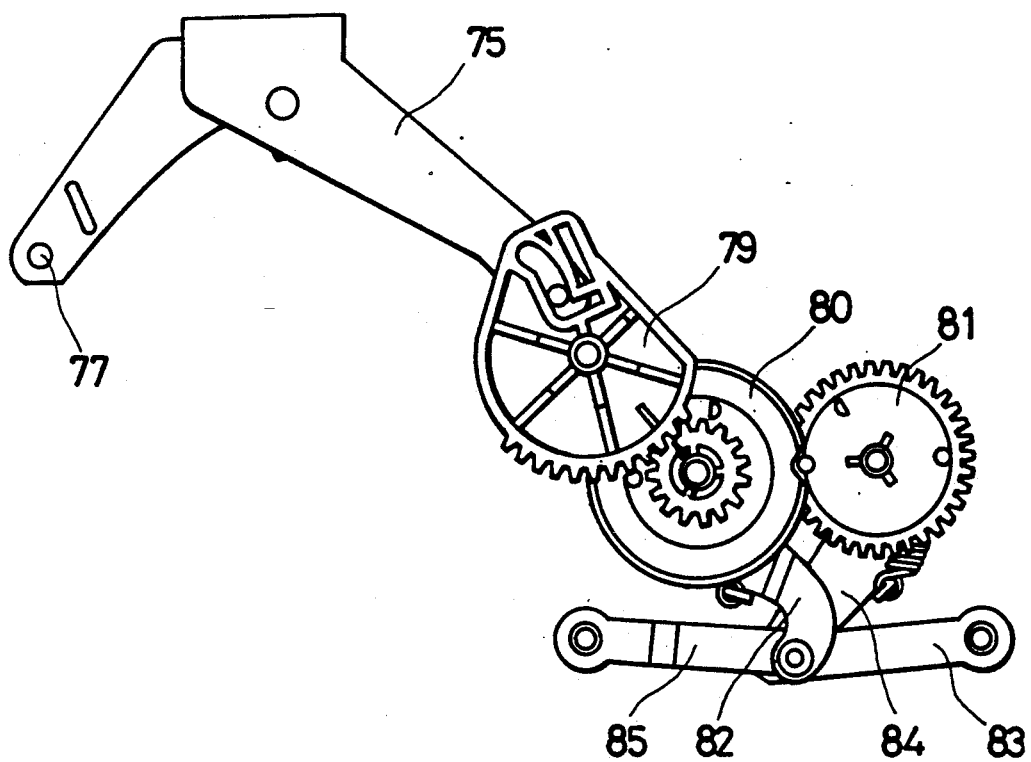
Figure 11:
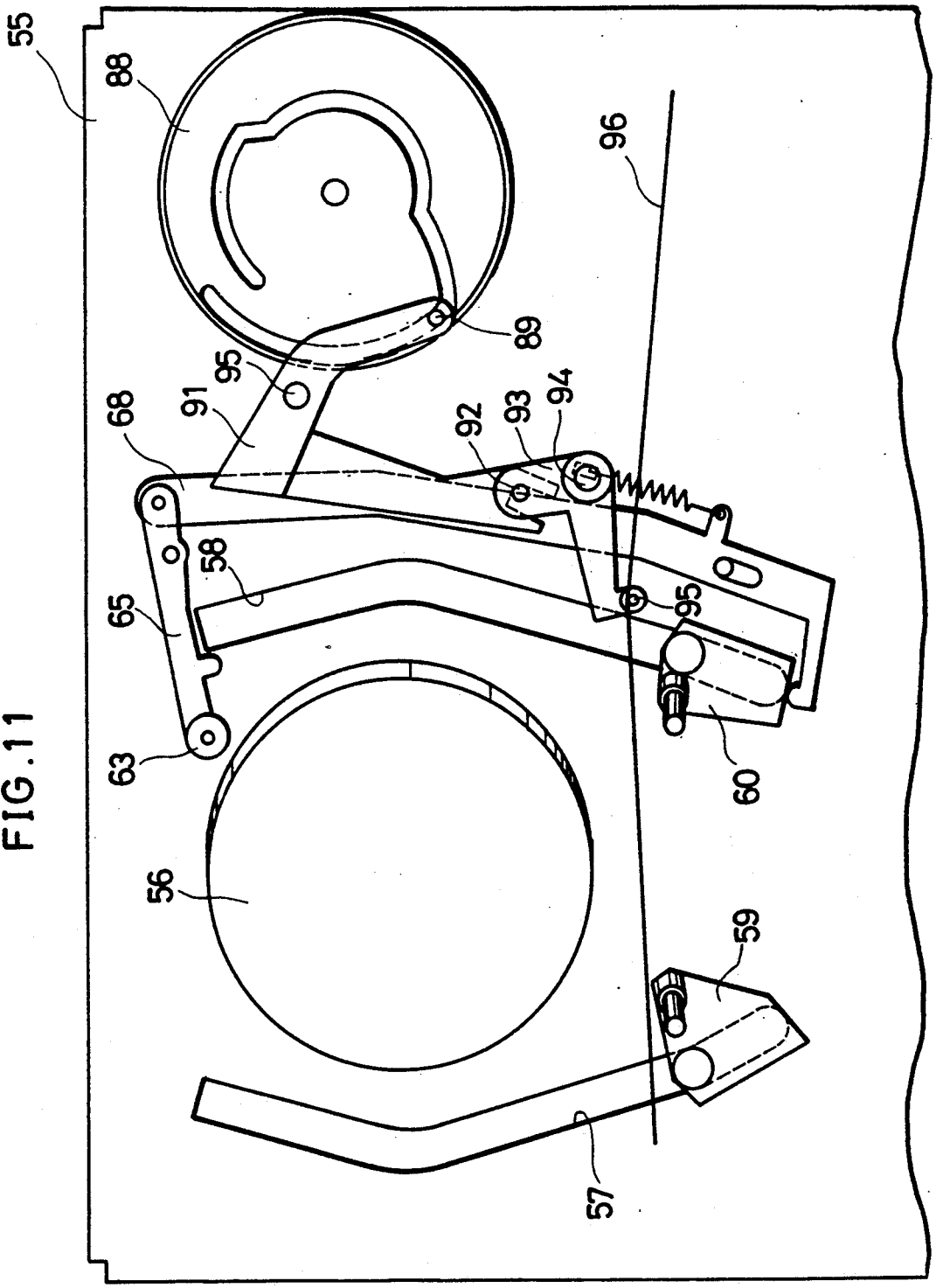
Figure 12:
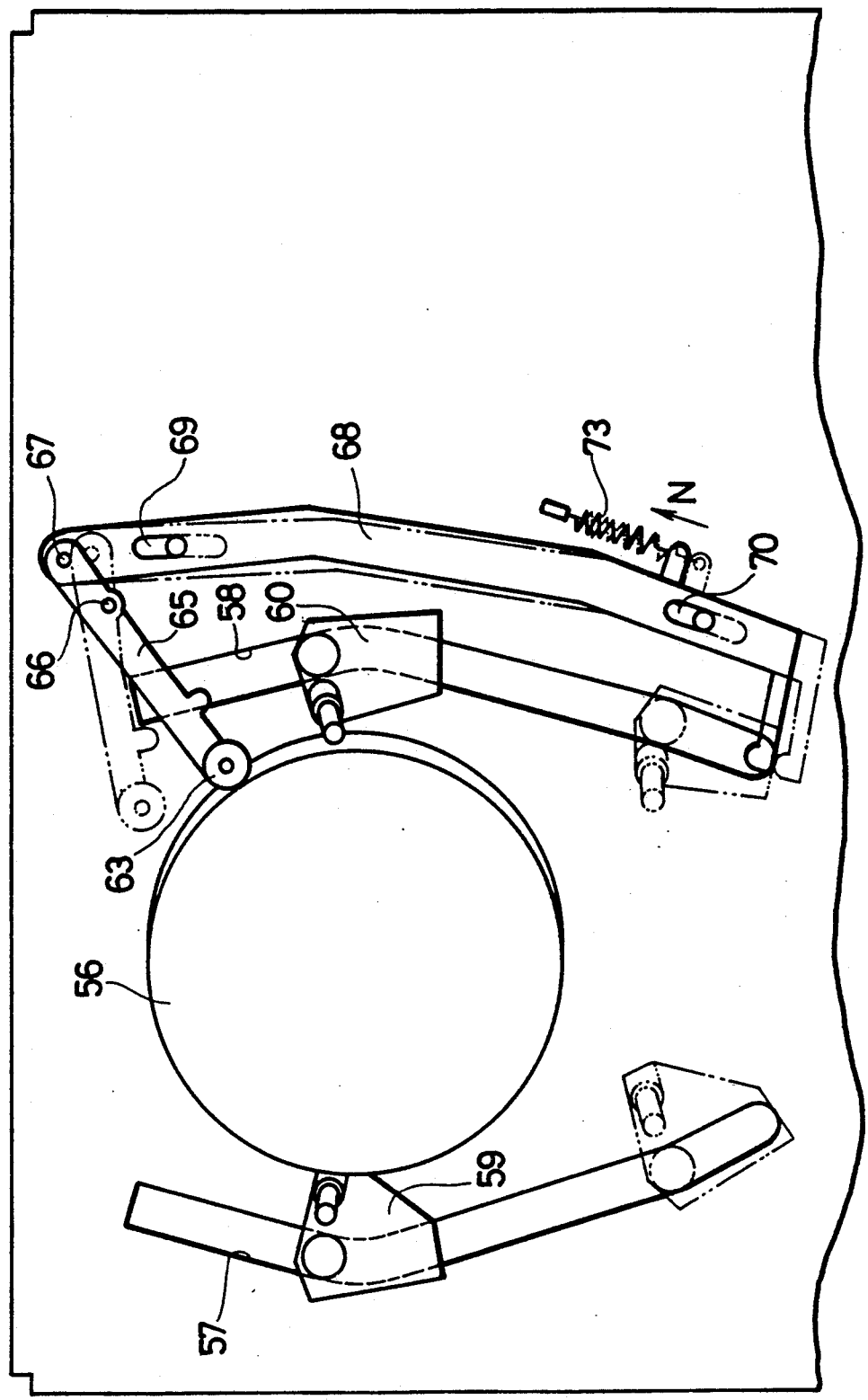
Figure 13:
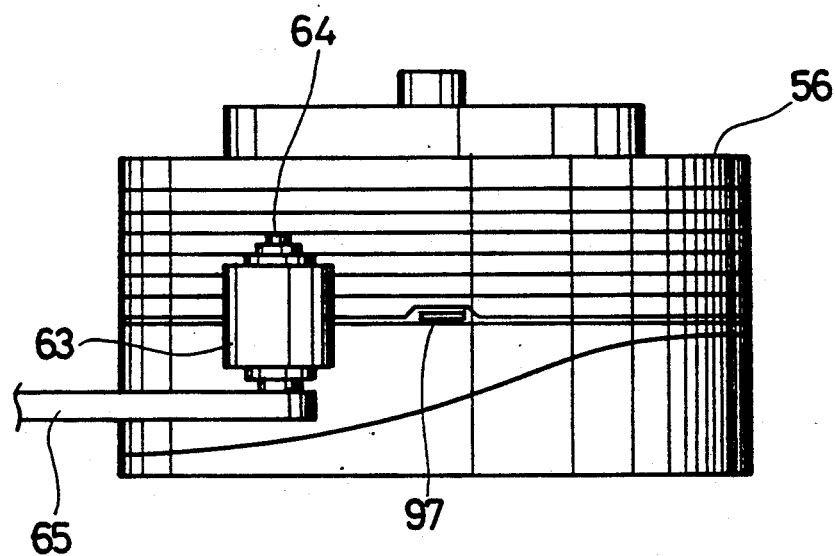
Figure 14:
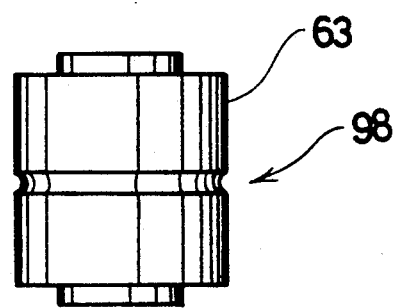

The following description will discuss still another embodiment of the present invention referring to FIG. 8.

As illustrated in FIG. 8, a cleaning lever 50 is provided with a cleaning unit 52 having a cleaner shaft 47 as a support shaft and a cleaning member 49 which is freely rotatably supported by the cleaner shaft 47. The cleaner shaft 47 is installed on the cleaning lever 50 with a raked appearance inclining in the rotation direction of a rotary drum 46 indicated by an arrow R from an axis perpendicular to a reference plane of the rotary drum 46. Further, the cleaner 47 has a sufficient length to reach a position corresponding to the upper portion of the rotary drum 46, and a stopper 48 as stop means is secured to the top thereof.

In the above arrangement, when the cleaning lever 50 is shifted to permit the cleaning member 49 to come into contact with the rotary drum 46 in rotation and thus a cleaning operation for a magnetic head 51 provided inside the rotary drum 46 is started, the cleaning member 49 rotates in accordance with the rotation of the rotary drum 46, and is shifted upward along the cleaner shaft 47 until it comes into contact with the stopper 48.

When the cleaning operation has been completed and the cleaning member 49 is separated from the rotary drum 46, the cleaning member 49 shifts itself downward along the cleaner shaft 47 by its own weight.

With the above arrangement, the cleaning member 49 is shifted upward while rotating in accordance with the rotation of the rotary drum 46 in cleaning operation. Therefore, since a wider portion of the cleaning member 49 is used, occurrence of an abrasion section concentrated only on one portion thereof is avoidable. Further, since the cleaning member 49 shifts itself downward to the initial position by its own weight, repeatable use is available.

Therefore, in a cleaning unit of the present invention, a cleaning member can be used on a wide range of its surface, thereby allowing abrasion to the surface of the cleaning member to occur evenly. Consequently, a stable cleaning operation can be obtained even if the number of applications is increased, and life of the cleaning member can be extended.

The invention being thus described, it may be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. A magnetic head cleaning system for cleaning a magnetic head provided inside a rotary drum installed on a chassis while a tape is being guided thereto, comprising:
   a cleaning device including:
   a cleaning lever capable of pivoting freely and supported by a pivot secured to the chassis; cleaning means installed at an end of the cleaning lever located toward the rotary drum; a resilient member for urging the cleaning lever to permit the cleaning means to come into contact with the rotary drum; and means for pivoting the cleaning lever, the cleaning means cleaning the magnetic head by coming into contact with the rotary drum; and
   tape guiding means including at least one movable tape guiding member for guiding the tape, and a drive member capable of pivoting freely about a pivot which is secured to the chassis and supports the drive member, the drive member being operatively connected to the at least one movable tape guiding member,
   the drive member being adapted to permit the cleaning means to be separated from the rotary drum by coming into contact with the means for pivoting.

2. The magnetic head cleaning system as set forth in claim 1, wherein the resilient member is a spring having a first end and a second end, the first end being connected to the cleaning lever, and the second end being connected to the chassis.

3. The magnetic head cleaning system as set forth in claim 1, wherein the means for pivoting includes a first pivoting member and a second pivoting member, and the drive member includes a pressing portion formed on a side thereof, wherein the cleaning means separates from the rotary drum due to the second pivoting member being pressed by the pressing portion when guiding of the tape is started, and the cleaning means separates from the rotary drum due to the first pivoting member being pressed by the tape guiding member when the guiding of the tape is completed.

4. The magnetic head cleaning system as set forth in claim 3, wherein the cleaning lever further includes a protruding portion; the second pivoting member is a pin installed on the protruding portion; and the first pivoting member is a projecting portion for pivoting the cleaning lever by being pressed upon the tape guiding member.

5. The magnetic head cleaning system as set forth in claim 4, wherein the tape guiding means further includes: a cam and a transmission gear; the drive member is a transmission gear drive lever having a first end and a second end, the first end being connected to the cam, the second end being connected to the transmission gear; and the tape guiding member is a pole base provided with a pole for engaging the tape, whereby the transmission gear drive lever causes the cleaning means to be separated from the rotary drum when guiding of the tape is started, the cleaning means being separated therefrom due to the pole base pressing the pin; causes the cleaning means to contact with the rotary drum during the guiding of the tape, the cleaning means contacting with the rotary drum by the resilient member due to the relaxation of a pressing force on the pin as the pole base; and when the guiding of the tape has been completed, pivots in cooperation with the cam so as to shift the pole base to a position where it presses the projecting portion.

6. The magnetic head cleaning system as set forth in claim 5, wherein the cam, the transmission gear drive lever and the transmission gear are installed on a surface of the chassis opposite to a surface where the cleaning lever is installed, and the pressing portion contacts with the pin through a hole formed in the chassis.

7. The magnetic head cleaning system as set forth in claim 1, wherein the drive member has a first pressing portion, a second pressing portion and a cam portion, and the pivoting means is a pin, the cleaning means separating from the rotary drum when the first pressing portion presses the pin; the cleaning means contacting with the rotary drum when the cam portion comes into contact with the pin; and the cleaning means separating from the rotary drum when the second pressing portion presses the pin.

8. The magnetic head cleaning system as set forth in claim 7, wherein the tape guiding member includes a half-load lever having a half-load shaft for engaging the tape, the half-load lever being capable of pivoting freely and supported by a pivot secured to the chassis, and the drive member is a drive lever connected to the half-load lever, whereby the drive lever pivots in such a manner that the first pressing portion comes into contact with the pin when the half-load lever starts guiding a tape; the cam portion contacts with the pin while the half-load lever is guiding the tape; and the second pressing portion comes into contact with the pin when the half-load lever has finished guiding the tape.

9. A cleaning method for a magnetic head provided inside a rotary drum installed on a chassis comprising the steps of:

maintaining a cleaning member separate from the rotary drum by the pressing a pin provided on a first portion of a cleaning lever having the cleaning member with a drive member connected to a tape guiding member and by allowing the cleaning lever to pivot;

shifting the tape guiding member in cooperation with the drive member;

causing the cleaning member to come into contact with the rotary drum by the relaxation of the pressing force on the pin by the drive member and by the pivoting of the cleaning lever due to a resilient member; and separating the cleaning member from the rotary drum by causing the tape guiding member to come into contact with a second portion of said cleaning lever and free of a pressing force by said drive member on the pin.

10. A cleaning method for a magnetic head provided inside a rotary drum installed on a chassis comprising the steps of:

separating a cleaning member from the rotary drum by causing a drive member connected to a tape guiding member to press a pin provided in a cleaning lever having the cleaning member, and by causing the cleaning lever to pivot;

making the cleaning member come into contact with the rotary drum by causing the pin to come into contact with a cam portion of the drive member, and by causing the cleaning lever to be pivoted; and separating the cleaning member from the rotary drum by causing the drive member to press the pin and by causing the cleaning lever to be pivoted.

11. A magnetic head cleaning system for cleaning a magnetic head provided inside a rotary drum installed on a chassis while a tape is being guided thereto, said system including preloading, loading, and loading-complete stages of operation of the tape comprising:

a cleaning device including a freely pivotable cleaning lever supported by a pivot pin secured to the chassis, cleaning means installed at one end of the cleaning lever toward the rotary drum for cleaning the magnetic head provided therein, a resilient member for normally biasing the cleaning lever and cleaning means toward the rotary drum, a first pivoting means for pivoting said cleaning lever away from said rotary drum, and second pivot means for pivoting said cleaning lever away from said rotary drum;

tape guiding means including at least one movable tape guiding member a freely pivotable drive member supported by a pivot pin secured to the chassis, said drive member being connected to the tape guiding member, and an actuating lever integrally formed with said drive member for pressing against said first pivoting means; and means for actuating said drive member;

wherein said actuating lever remains pressed against said first pivoting means in an unloaded stage, thereby maintaining separation of said cleaning lever and cleaning means from said head, said actuating lever being released from said first pivoting means by actuation and movement of said drive member in a loading stage, thereby enabling said resilient member to bias said cleaning lever and cleaning means into contact with said head, and said second pivoting means being pressed by said at least one moveable tape guiding member in a loading-complete stage, thereby separating said cleaning lever and cleaning means from said head.

12. The magnetic head cleaning system as set forth in claim 11, wherein the resilient member is a spring having a first end and a second end, the first end being connected to the cleaning lever, and the second end being connected to the chassis.

13. The magnetic head cleaning system as set forth in claim 11, wherein said means for actuating said drive member includes a cam and a transmission gear, and wherein the drive member is a transmission gear drive lever having a first end and a second end, the first end being connected to the transmission gear, and the tape guiding member is a pole base provided with a pole for engaging the tape.

14. The magnetic head cleaning system as set forth in claim 13, wherein the cam, the transmission gear drive lever and the transmission gear are installed on a surface of the chassis opposite to a surface of the chassis where the cleaning lever is installed, and the actuating lever contacts with the first pivot means through a hole formed in the chassis.

15. The magnetic head cleaning system as set forth in claim 11, wherein the tape guiding member includes a half-load lever having a half-load shaft for engaging the tape, the half-load lever being capable of pivoting freely and supported by a pivot secured to the chassis, and the drive member is a drive lever connected to the half-load lever, whereby the drive lever pivots in such a manner that the first pressing portion comes into contact with the pin when the half-load lever starts guiding a tape; the cam portion contacts with the pin while the half-load lever is guiding the tape; and the second pressing portion comes into contact with the pin when the half-load lever has finished guiding the tape.

* * * * *